United States Patent [19]
Troxel et al.

[11] Patent Number: 6,014,381
[45] Date of Patent: Jan. 11, 2000

[54] SYSTEM AND METHOD FOR DISTRIBUTING INFORMATION THROUGHOUT AN AIRCRAFT

[75] Inventors: Robert V. Troxel; Gregory K. Henrikson, both of Brea; Toshiharu Fukui, Newport Beach, all of Calif.

[73] Assignees: Sony Corporation, Tokyo, Japan; Sony Trans Com, Inc., Irvine, Calif.

[21] Appl. No.: 08/713,536

[22] Filed: Sep. 13, 1996

[51] Int. Cl.[7] ...................................................... H04N 7/10
[52] U.S. Cl. ........................... 370/395; 370/466; 370/401; 348/8
[58] Field of Search ..................................... 370/465, 466, 370/467, 395, 396, 397, 399, 420, 480, 485, 486, 487, 401, 352, 469; 455/4.1, 4.2, 5.1; 348/6–8

[56] References Cited

U.S. PATENT DOCUMENTS

| | | |
|---|---|---|
| 3,795,771 | 3/1974 | Gunderson et al. ........................ 179/15 |
| 4,352,200 | 9/1982 | Oxman ....................................... 455/41 |
| 4,428,078 | 1/1984 | Kuo ............................................. 455/3 |
| 4,584,603 | 4/1986 | Harrison .................................... 358/86 |
| 4,647,980 | 3/1987 | Steventon et al. ...................... 358/254 |
| 4,763,360 | 8/1988 | Daniels et al. ............................. 455/3 |
| 4,774,514 | 9/1988 | Hildebrandt et al. ................... 340/971 |
| 4,835,604 | 5/1989 | Kondo et al. .............................. 358/86 |
| 4,866,515 | 9/1989 | Tagawa et al. ............................ 358/86 |
| 4,896,209 | 1/1990 | Matsuzaki et al. ....................... 358/86 |

(List continued on next page.)

FOREIGN PATENT DOCUMENTS

| | | |
|---|---|---|
| 0 701 384 | 7/1995 | European Pat. Off. . |
| 0 671 861 | 9/1995 | European Pat. Off. . |
| 0 277 014 | 3/1996 | European Pat. Off. . |
| 41 23 851 | 11/1992 | Germany . |

OTHER PUBLICATIONS

"Two–Way Street" *Inflight,* Harbison & Dunn, pp.14–18 (Mar. 1996).
"Airframers Force Disipline in High–Stakes IFE Market" *Aerospace Business,* Velocci, pp. 41–43 (Mar. 25, 1996).
"MDDS Is Here!" *Digital Video News* p. 1 (Jul. 1995).
"Flying Those Interactive Skies" *TV Technology,* Morris (Oct. 1995).
"Optibase & BEA Make MPEG Fly!", Unlisted, *Digital Video News* Jul. 1995.
"Video–On–Demand Trail Starts on Alitalia Airlines Other Airplane Tests Have Same Maddening Delays as Cable/Telco Trials", Unlisted, *European Media Business & Finance* Nov. 3, 1995.
"BE Aerospace Interactive Video System Successfully Debuts on British Airways B747; Company Awarded $33 Million in New Seating Programs" Unlisted, *Business Wire* Nov. 21, 1995.
"TNCi Continues Airview(TM) Enhancement with Telephone Interface", Unlisted, *PR Newswire* Nov. 28, 1995.
"First Totally Digitalized In–Flight Entertainment System to be Introduced on International Carrier—Alitalia; IFT System will Debut on Rome to Chicago Flight Dec. 1st", Unlisted, *Business Wire* Nov. 30, 1995.

(List continued on next page.)

*Primary Examiner*—Chau Nguyen
*Attorney, Agent, or Firm*—Blakely, Sokoloff, Taylor & Zafman LLP

[57] ABSTRACT

A passenger entertainment system of an aircraft utilized to distribute audio and/or video in a digital format throughout a vehicle. The passenger entertainment system includes an Asynchronous Transfer Mode ("ATM") network interconnected to a high speed, serial distribution network propagating information in a predetermined format. Collectively, these digital networks support the broadcast of audio and/or video in real-time as well as actual "video on demand" services.

15 Claims, 7 Drawing Sheets

U.S. PATENT DOCUMENTS

| | | | |
|---|---|---|---|
| 4,897,714 | 1/1990 | Ichise et al. | 358/86 |
| 4,920,432 | 4/1990 | Eggers et al. | 360/33.1 |
| 4,975,696 | 12/1990 | Salter, Jr. et al. | 340/973 |
| 5,123,015 | 6/1992 | Brady, Jr. et al. | 370/112 |
| 5,214,505 | 5/1993 | Rabowsky et al. | 358/86 |
| 5,220,419 | 6/1993 | Sklar et al. | 358/86 |
| 5,289,272 | 2/1994 | Rabowsky et al. | 348/8 |
| 5,311,302 | 5/1994 | Berry et al. | 379/14 |
| 5,347,632 | 9/1994 | Filepp et al. | 395/200 |
| 5,387,927 | 2/1995 | Look et al. | 370/395 |
| 5,404,567 | 4/1995 | DePietro et al. | 455/6.3 |
| 5,414,455 | 5/1995 | Hooper et al. | 348/7 |
| 5,434,996 | 7/1995 | Bell . | |
| 5,442,390 | 8/1995 | Hooper et al. | 348/7 |
| 5,504,757 | 4/1996 | Cook et al. | 375/225 |
| 5,529,265 | 6/1996 | Sakurai | 244/118 |
| 5,539,448 | 7/1996 | Verhille et al. | 348/6 |
| 5,539,449 | 7/1996 | Blahut et al. | 348/7 |
| 5,543,951 | 8/1996 | Moerhrmann | 370/395 |
| 5,544,161 | 8/1996 | Bingham et al. . | |
| 5,555,466 | 9/1996 | Scribner et al. | 348/8 |
| 5,557,541 | 9/1996 | Schulhof et al. | 364/514 |
| 5,568,180 | 10/1996 | Okamoto | 348/7 |
| 5,568,181 | 10/1996 | Greenwood et al. | 348/7 |
| 5,568,484 | 10/1996 | Margis | 348/8 |
| 5,570,125 | 10/1996 | Oh et al. | 348/6 |
| 5,570,355 | 10/1996 | Dail et al. | 370/352 |
| 5,572,442 | 11/1996 | Schulhof et al. | 455/4.2 |
| 5,581,270 | 12/1996 | Smith et al. | 345/2 |
| 5,586,937 | 12/1996 | Menashe | 463/41 |
| 5,596,647 | 1/1997 | Wakai et al. | 381/77 |
| 5,608,447 | 3/1997 | Farry et al. | 348/7 |
| 5,608,448 | 3/1997 | Smoral et al. | 348/7 |
| 5,612,730 | 3/1997 | Lewis | 348/12 |
| 5,627,836 | 5/1997 | Conoscenti et al. | 370/486 |
| 5,631,693 | 5/1997 | Wunderlich et al. | 348/7 |
| 5,634,012 | 5/1997 | Stefik et al. | 395/239 |
| 5,671,217 | 9/1997 | Adams et al. | 370/486 |
| 5,787,259 | 7/1998 | Haroun et al. | 348/14 |
| 5,808,660 | 9/1998 | Sekine et al. | 348/8 |

OTHER PUBLICATIONS

"TNC to Put Internet Service into its IFE", Unlisted, *In–Flight Entertainment* Jan. 1996.

"Interactive Flight Technologies Signs Agreement with Swissair; IFT to Install In–Flight Enterainment System, Complete with Casino–Style Gambling, On All 21 of its Long–Haul Jets", *Business Wire* May 2, 1996.

The Network Connection Announces Hiper Cheetah—300 Simultaneous Video Streams, Unlisted, *PR Newswire* Jun. 7, 1996.

SYSTEM AND METHOD FOR DISTRIBUTING INFORMATION THROUGHOUT AN AIRCRAFT

BACKGROUND OF THE INVENTION

1. Field of the Invention

The present invention relates to the field of communication networks. More particularly, the present invention relates to a system and method for distributing audio and video in a digital format throughout a vehicle.

2. Description of Art Related to the Invention

Over the last few decades, commercial aircraft has become a necessary mode of travel for personal and business reasons. In order to improve passenger comfort, many commercial airlines have implemented in-flight entertainment ("IFE") systems which offer on-board telephony as well as in-flight movies broadcasted at a preselected time.

Currently, the distribution of audio and video throughout a commercial aircraft is accomplished through the implementation of analog circuitry. More specifically, an audio/video source (e.g., a television tuner, video tape reproducers) is implemented on the aircraft to transfer both audio and video in analog form to a radio frequency ("RF") modulator. The audio is synchronized with the video by time bracketing a portion of audio with a particular frame of video.

The RF modulator converts the audio and video (collectively referred to as "media") from the audio/video source into a RF signal having a particular bandpass frequency. The RF signal is input into a combiner which is circuitry that combines several RF signals together to produce one analog signal. The analog signal is routed to an amplifier, and is subsequently distributed throughout the aircraft over coaxial cable. The coaxial cable enables the amplified analog signal to be sent to various drivers positioned at certain areas of the aircraft. These drivers propagate the amplified analog signal to a number of passenger seats. Each passenger seat includes a RF demodulator which is selectively tuned by the passenger to a particular RF frequency to be able to view the video and/or listen to the audio.

Recently, many commercial airlines are now in the process of implementing more advanced IFE systems which offer a greater variety of in-flight entertainment such as video games, pay-per-view movies, hotel reservations services, and the like. As a result, the conventional IFE system suffers from a number of architectural deficiencies. One deficiency is that the conventional IFE system requires RF modulation and demodulation circuitry which adds significant weight to the aircraft. It is well known that additional weight of the aircraft reduces its fuel economy.

A second deficiency associated with the conventional IFE system is that it possesses high movie startup latency characteristics and is incapable of supporting a large number (e.g., greater than twenty) of analog channels. In order for the conventional IFE system to provide both broadcast and actual "video on demand" services, namely the ability of each passenger to select playback of any video at any given time period as opposed to other prior systems that offer feature films at selected start increments, a greater number of analog channels are required. Although the conventional IFE system 10 could be modified to support video on demand and broadcast media through additional cabling or circuitry, such modification would disadvantageously increase the weight of the aircraft.

Hence, it would be advantageous to create a digital network which eliminates the above-cited disadvantages. The topology of the digital network should be able to support real-time broadcasting of media as well as video on demand.

SUMMARY OF THE INVENTION

The present invention relates to a system and method for distributing audio and video in a digital format throughout an aircraft. The system includes an Asynchronous Transfer Mode ("ATM") network interconnected to a high speed, serial distribution network propagating information in a format preferably in accordance with IEEE 1394 standards. The ATM network receives data in an analog format and digitizes the data before propagation through the networks. Collectively, these digital networks support the broadcast of audio and/or video in real-time as well as actual "video on demand" services.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In its preferred embodiment, the present invention relates to a network and method for distributing audio and video in a digital format throughout a vehicle including, but not limited to aircraft, trains, ferries, buses and other modes of mass transit. For clarity sake, the embodiment of the present invention described herein will be implemented in a commercial aircraft.

Certain terms are used herein to describe certain characteristics or circuitry of a digital network implemented within a commercial aircraft. For example, "data" may include compressed or non-compressed audio, video, or audio and video in a synchronous relationship. It is contemplated that data may further include programs, credit card charge information, or any other groupings of digital information. A "seat electronics unit" (SEU) is circuitry used to control the propagation of data into peripheral devices (e.g., display, passenger control unit) of a group of passenger seats, or from another SEU serially connected to the SEU. An "ATM cell" is a series of data bytes including a cell header and a payload. The preferred cell header is 5-bytes in length and includes an 8-bit virtual path identifier ("VPI") and a 16-bit virtual channel identifier ("VCI"). The VPI and VCI may be collectively used as a 24-bit routing identification. The preferred length of the payload is 48-bytes. An "end node" is a logical entity associated with a unique address for the second digital network. The logical entity represents a location on a vehicle which can receive data (e.g., a seat within the vehicle).

Figure 1:
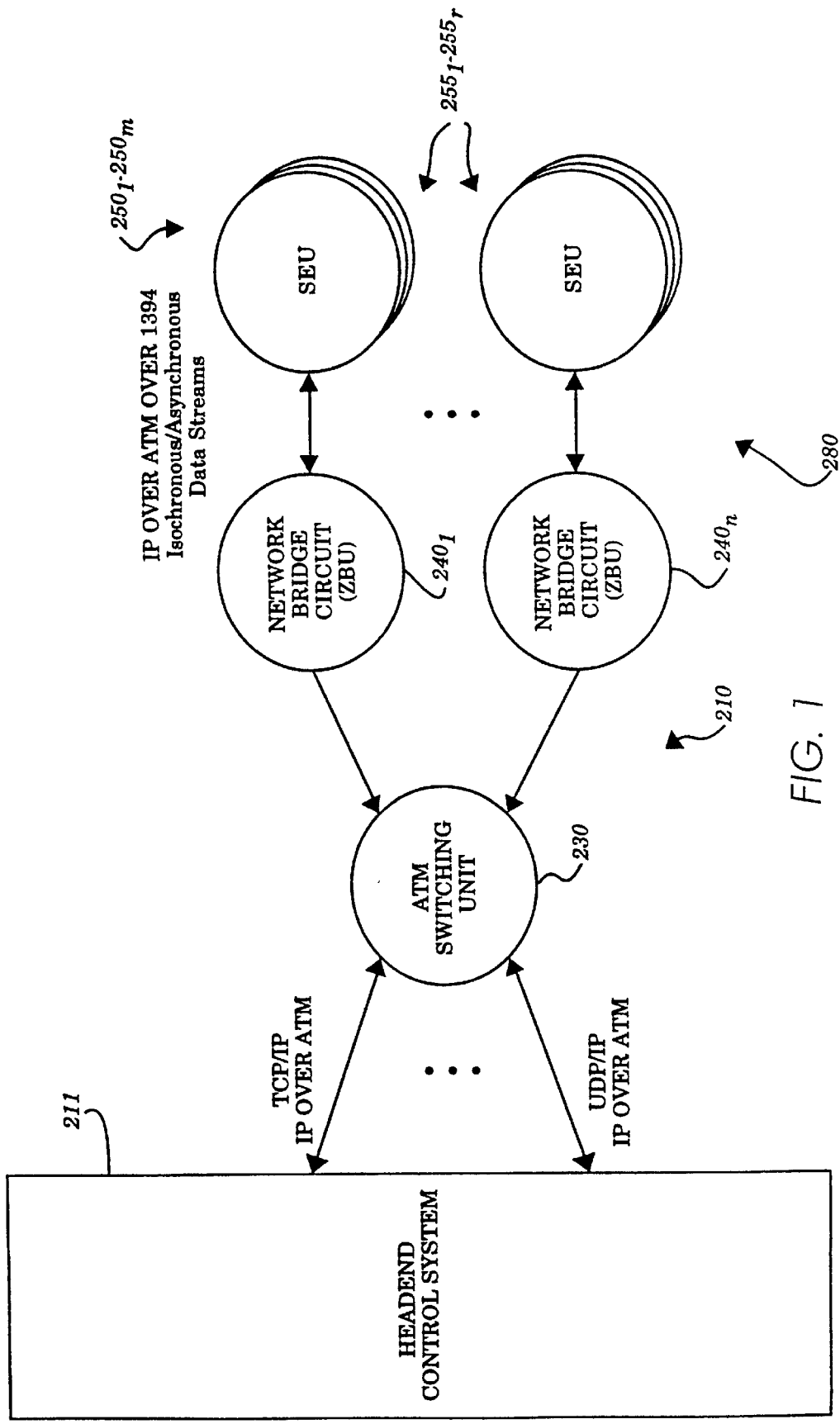
FIG. 1 is a general diagram of the hybrid topology of the IFE system which includes an ATM network and a serial distributed network having IEEE 1394 electrical standards which collectively support the broadcast of media in real-time.

Referring to FIG. 1, a block diagram of a preferred hybrid topology of an in-flight entertainment ("IFE") system is shown. In general, the IFE system 200 comprises a first digital network 210 coupled to a second digital network 280 through a plurality of network bridge circuits $240-240_n$ ("n" being a positive whole number), preferably zone bridge units ("ZBUs") described below. The first digital network 210 transfers information in a first digital format to the network bridge circuit 240 which converts the information into a second digital format for transmission through the second digital network 280. In this embodiment, the first digital network 210 is an Asynchronous Transfer Mode ("ATM") network to provide point-to-point interconnection, while the second digital network 280 is a high speed, serial distribution network (e.g., a network operating in accordance with IEEE 1394 electrical standards) that provides high-speed communication as well as broadcast capabilities. It is contemplated, however, that other interconnect technologies may be used such as Fiber channel, Ethernet and Token-Ring. However, these technologies are inferior in their use on vehicles for the following reasons. Fiber channel is costly and a less established technology. Ethernet is a point-to-point technology requiring substantial cabling for its implementation. Token Ring is not well suited for video propagation due to speed and latency constraints.

The ATM network 210 includes a headend control system 211 coupled to an ATM switch unit 230. The headend control system 211 transmits information in the form of ATM cells constructed in accordance with well-known network protocols such as Transmission Control Protocol/Internet Protocol ("TCP/IP") or User Datagram Protocol/Internet Protocol ("UDP/IP") as well as "IP over ATM" protocol (RFC-1577). The information is routed from the headend control system 211 through the ATM switch unit 230 and into a targeted ZBU (e.g., ZBU $240_1$). Within the targeted ZBU, the information is converted to an IEEE 1394 format for propagation through the serial distribution network 280 for subsequent delivery to one or more targeted end node(s) associated with a set of SEUs (e.g., SEUs $250_1-250_r$, where "r" is a positive whole number) coupled to the targeted ZBU. If necessary, the information is converted from digital to analog at the SEUs.

Additionally, the IFE system 200 enables information in an IEEE 1394 format to be routed from an end node, to a SEU (e.g., SEU $250_1$), and then to a ZBU (e.g., ZBU $240_1$) associated with the SEU. Within the ZBU, the information is formatted for transmission through the ATM network 210 as ATM cells. These ATM cells are transferred to the ATM switch unit 230 and routed to the headend control system 211.

Figure 2:
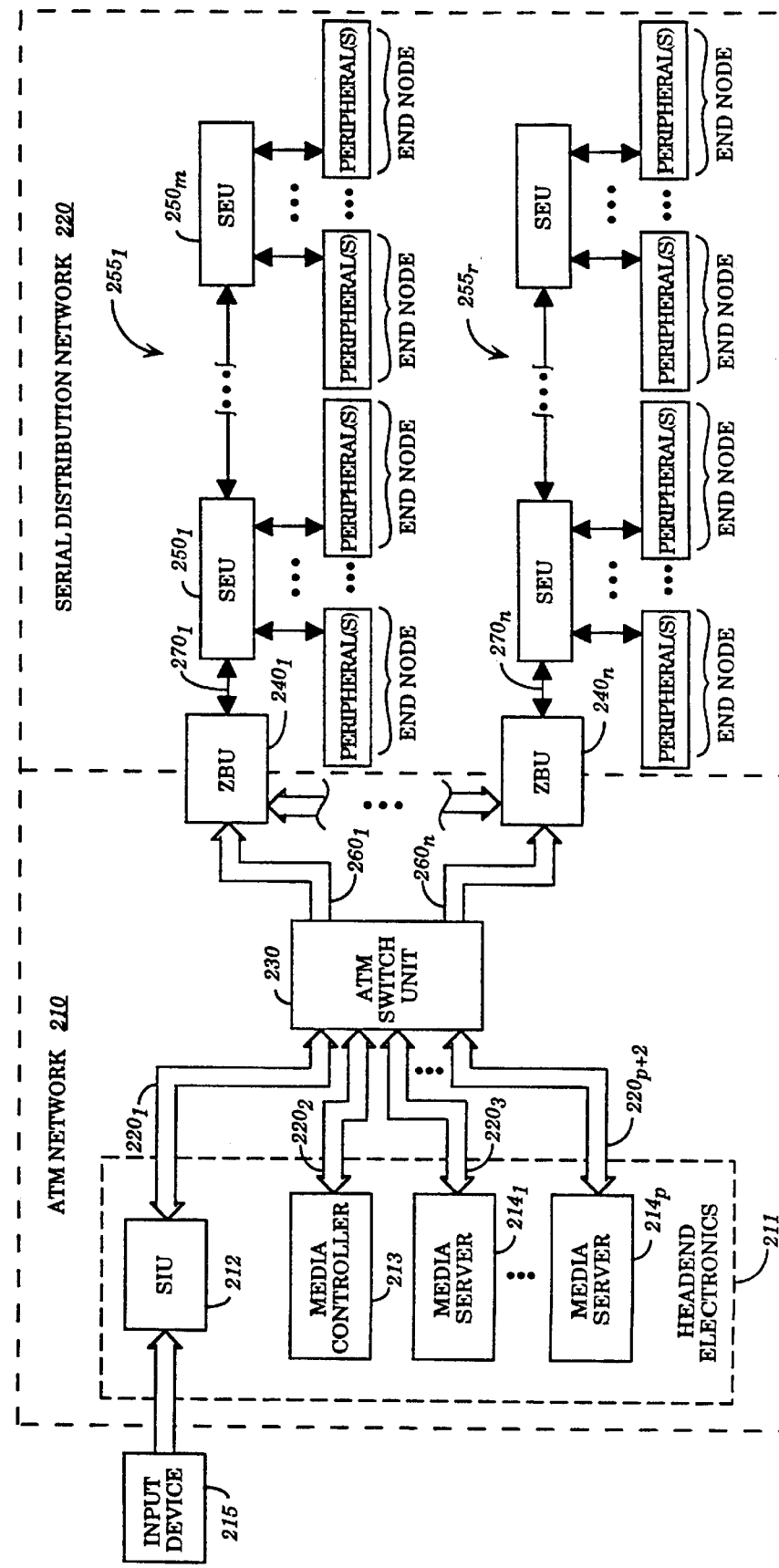
FIG. 2 is an embodiment of the IFE system of FIG. 1 which is able to at least broadcast data in real-time.

Referring now to FIG. 2, a more detailed illustration of the hybrid topology of the IFE system 200 is shown. As indicated above, the IFE system 200 comprises the ATM network 210 coupled to the serial distribution network 280 operating in accordance with IEEE 1394 electrical standards. The plurality of ZBUs $240_1-240_n$, with the assistance of the ATM switch unit 230, provide the interface for coupling together these distinct digital networks 210 and 280.

The headend control system 211, implemented within the ATM network 210, includes at least a system interface unit ("SIU") 212. The SIU 212 provides broadcast delivery of information including "live" (real-time) analog data received by the SIU 212. It is contemplated that the headend control system 211 may further include at least a media controller 213 and multiple media servers $214_1-214_p$ ("p" being a positive whole number).

The media controller 213 includes a hard disk drive and at least controls the overall operation of the IFE system, as well as managing the data flow between the headend control system 211 and the individual SEUs 250. The media controller 213 is therefore responsible for the scheduling of continuous data streams from the media servers $214_1-214_p$ to the SEUs and control of trick mode operation at each individual SEU. The trick mode operation includes the rescheduling of a data stream when a passenger sends fast forward, rewind, pause or stop instructions while viewing a video feature.

Each of the media servers $214_1-214_p$ includes one or more information storage means including hard disk drives, recordable compact disk players (e.g., digital video disks) and the like. These information storage means are used to store data to support video on demand, including data representing feature films and audio content. A preferred media server is the TIGER™, available from Microsoft Corporation of Redmond, Wash.

As shown, the SIU 212 allows data in analog form, obtained from one or more analog input devices 215, to be digitized before being transmitted in real-time through the ATM network 210. The analog input device 215 may include a video camera, a television antenna, an audio reproduce unit, which preferably includes a compact disk player, a laser disk player and a video reproduce unit which includes a video cassette player with the ability to output video from inserted video tapes. The analog-to-digital conversion is accomplished by an analog-to-digital ("A/D") converter (not shown) implemented within the SIU 212. The digitized data may be encoded under a compression technique (e.g., Motion Pictures Expert Group "MPEG") to optimize bandwidth and encrypted to ensure its authorized use, especially when the input data is to be subsequently loaded into one or more media servers to support video on demand. Examples of compression techniques include, but are not limited to, MPEG-1, and MPEG-2 if better picture quality is desirable and encryption/decryption techniques include public-private key cryptography, symmetric key cryptography and the like.

The SIU 212 further packetizes the data into a plurality of ATM cells before broadcasting these ATM cells over a digital communication link $220_1$. Preferably, the digital communication link $220_1$ is a fiber optic cable (e.g., "OC-3" digital fiber optics) which operates at approximately 155 megabits per second ("Mbps") on both the receive and transmit lines. Thus, in full duplex, the aggregate bandwidth of the digital communication link $220_1$ is approximately 311 Mbps. It is contemplated that OC-3 fiber is selected because it is a widely used medium, however other types of fiber optics (e.g., "OC-5") or even twisted copper wire may be used.

Figure 3:
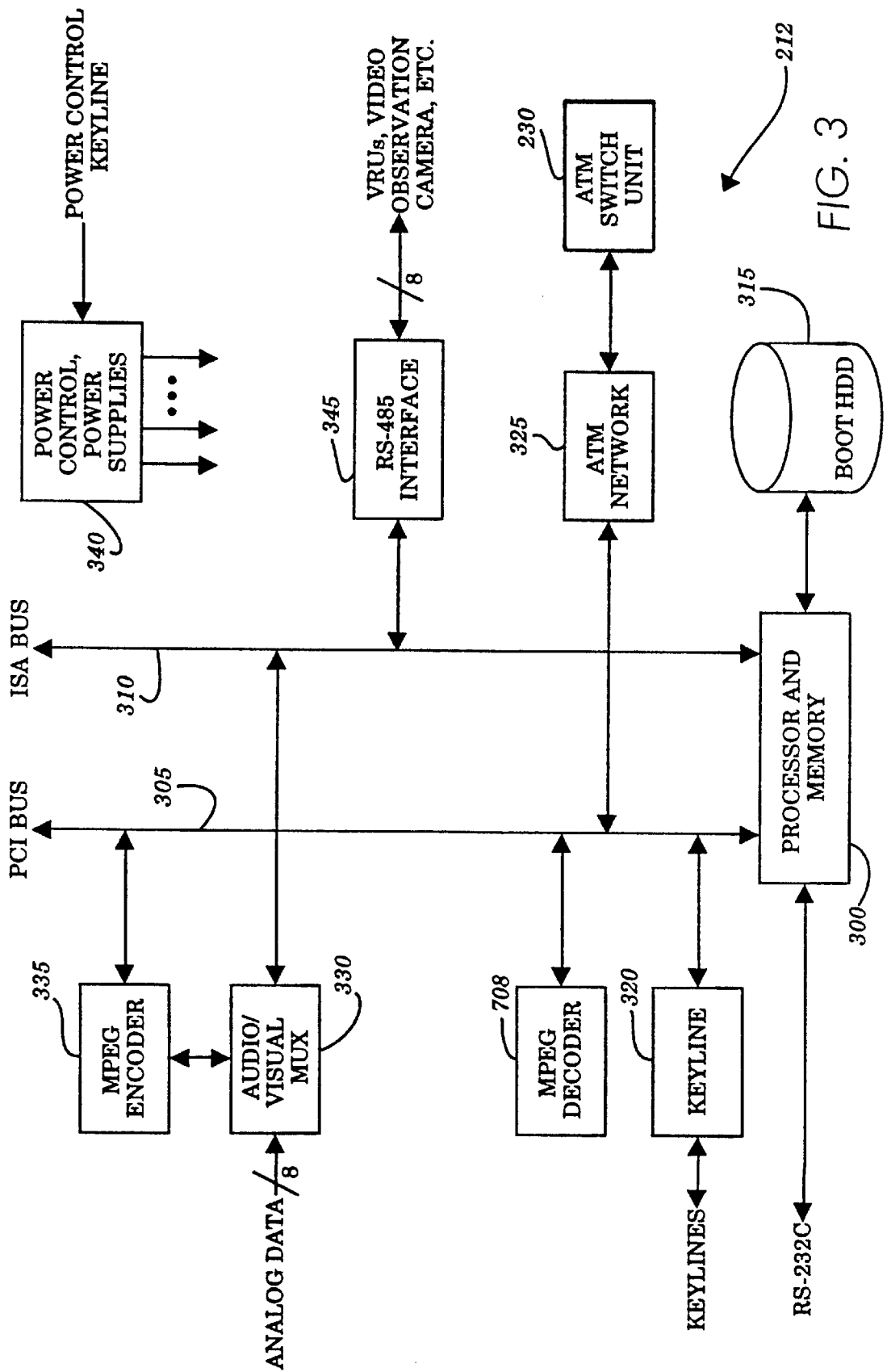
FIG. 3 is an embodiment of relevant components of the system interface unit of the IFE system of FIG. 2.

A detailed block diagram of the SIU 212 is illustrated in FIG. 3. A control processor 300 including memory is coupled to both a first bus (e.g., Peripheral Component Interconnect "PCI" bus) 305 and a second bus 310 (e.g., an Industry Standard Architecture "ISA" bus) for communicating with the other components within the SIU 212. A hard disk drive 315 is also coupled to the control processor 300.

A keyline interface circuit 320 is coupled to the ISA bus 310 to receive and send keyline control signals. An ATM network interface 325 is coupled to the ATM switch unit 230 and to the PCI bus 305, thereby allowing the SIU 212 to communicate over the ATM network 210. An audio/video multiplexer 330 is coupled to receive analog data from one or more analog input devices. The audio/video multiplexer 330 is also coupled to an MPEG encoder circuit 335 and to the ISA bus 310. The MPEG encoder circuit 335 is coupled to the PCI bus 305. A power control and power supply circuit 340 is coupled to receive power control keyline signals and to provide power to the components within the SIU 212. A RS-485 standard interface circuit 345 is coupled to communicate with at least the video reproduce units ("VRUs") and an observation video camera. The RS-485 standard interface circuit 345 is also coupled to the ISA bus 310. Alternatives, an IEEE 1394 format may be used to interconnected the observation camera, VRUs and the like to the ISA bus 310.

Referring back to FIG. 2, the digital communication link $214_1$ is coupled to the preferred ATM switch unit 230, conditioned for use in commercial aircraft and manufactured by Fore Systems of Warrendale, Pa. The ATM switch unit 230 is the control switching fabric for the IFE system 200 by routing data between the headend control system 211 and the ZBUs $240_1$–$240_n$ and providing power supply redundancy. Unlike typical ATM point-to-point networks, the ATM switch unit 230 supports point-to-multipoint communications by replicating the transmissions of ATM cells received via digital communication link $220_1$ for propagation through digital communication links $260_1$–$260_n$ uniquely coupled to the plurality of ZBUs $240_1$–$240_n$.

Figure 4:
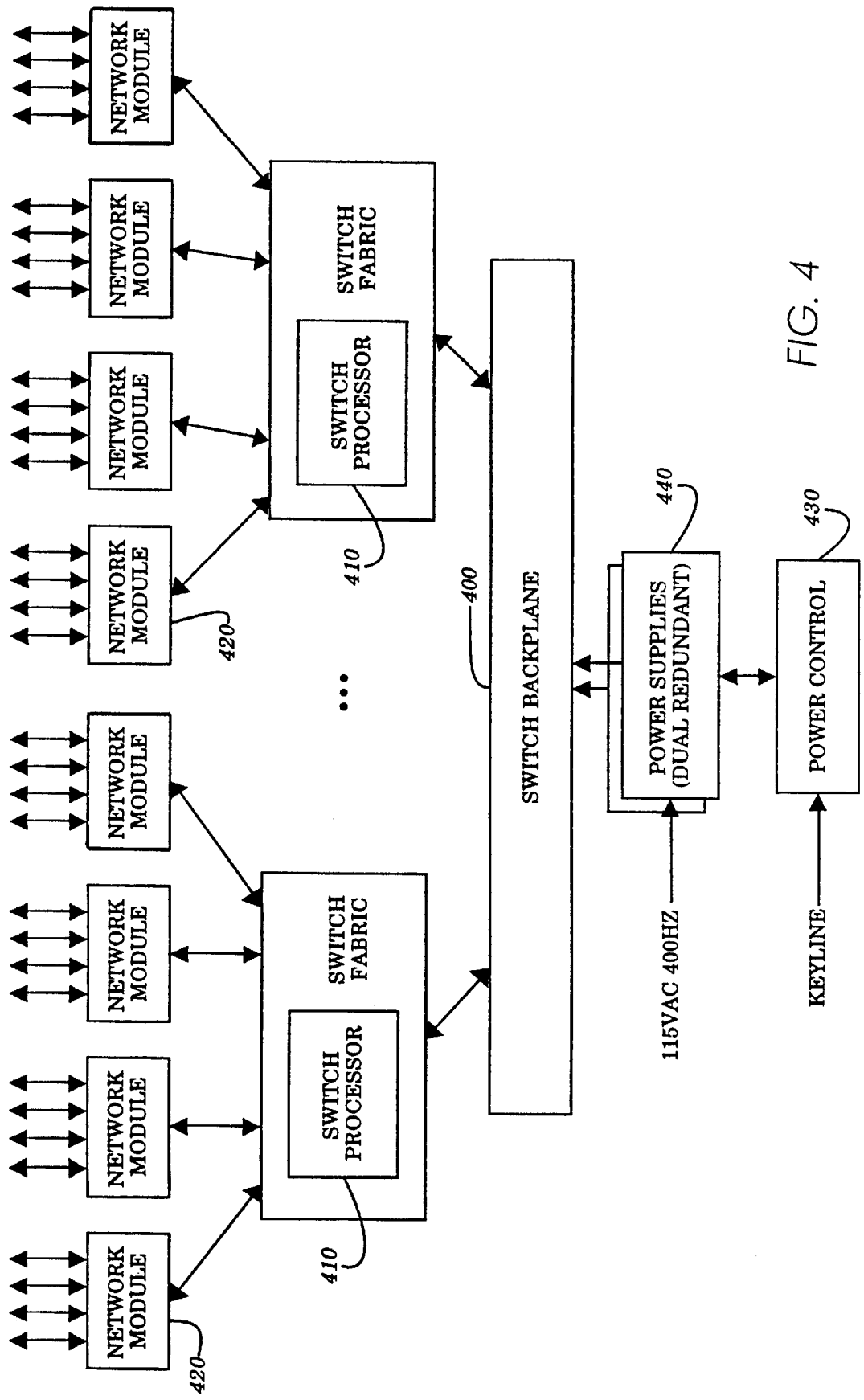
FIG. 4 is an embodiment of relevant components of the ATM switch unit of the IFE system of FIG. 2.

As shown in FIG. 4, the ATM switch unit 230 includes a switch backplane 400 coupled to one or more switch control processors 410. Each switch control processor 410 is coupled to one or more network modules 420, which each include multiple ATM network ports through which communications are transmitted and received. Each ATM port interfaces with an ATM network interface within a component of the IFE system for directing communications over the ATM network. Each network module 420 preferably includes four ATM ports, although another number of ports may be supported so that the ATM switch unit 230 provides a substantial number of ports (e.g., 32 ports as shown). A power control keyline signal may be input into a power control circuit 430 to turn "on" or "off" the ATM switch unit 230. The power control circuit 430 is coupled to a dual redundant power supply circuit 440. The power supply circuit 440 is coupled to receive a 115 volt AC, 400 Hertz, power line signal. The power supply circuit 440 is also coupled to the switch backplane circuit 400 for providing power to the components within the ATM switch unit 230.

Referring back to FIG. 2, the ZBUs $240_1$–$240_n$ function as a bridge between the high speed, fiber optic ATM network 210 and the serial distribution network 280 for the particular zones (or areas) of the vehicle. More specifically, each ZBU is responsible for managing serial distribution network 280 for a zone within the vehicle including IEEE 1394 bus management and IEEE 1394 bandwidth resource management. Each ZBU is further responsible for mapping IEEE 1394 addressing to ATM addressing as well as supporting broadcast and multicast functionality between the ATM network 210 and serial distribution network 280 for that zone. The ZBUs $240_1$–$240_n$ are coupled together through IEEE 1394 standard digital cables.

Figure 5:
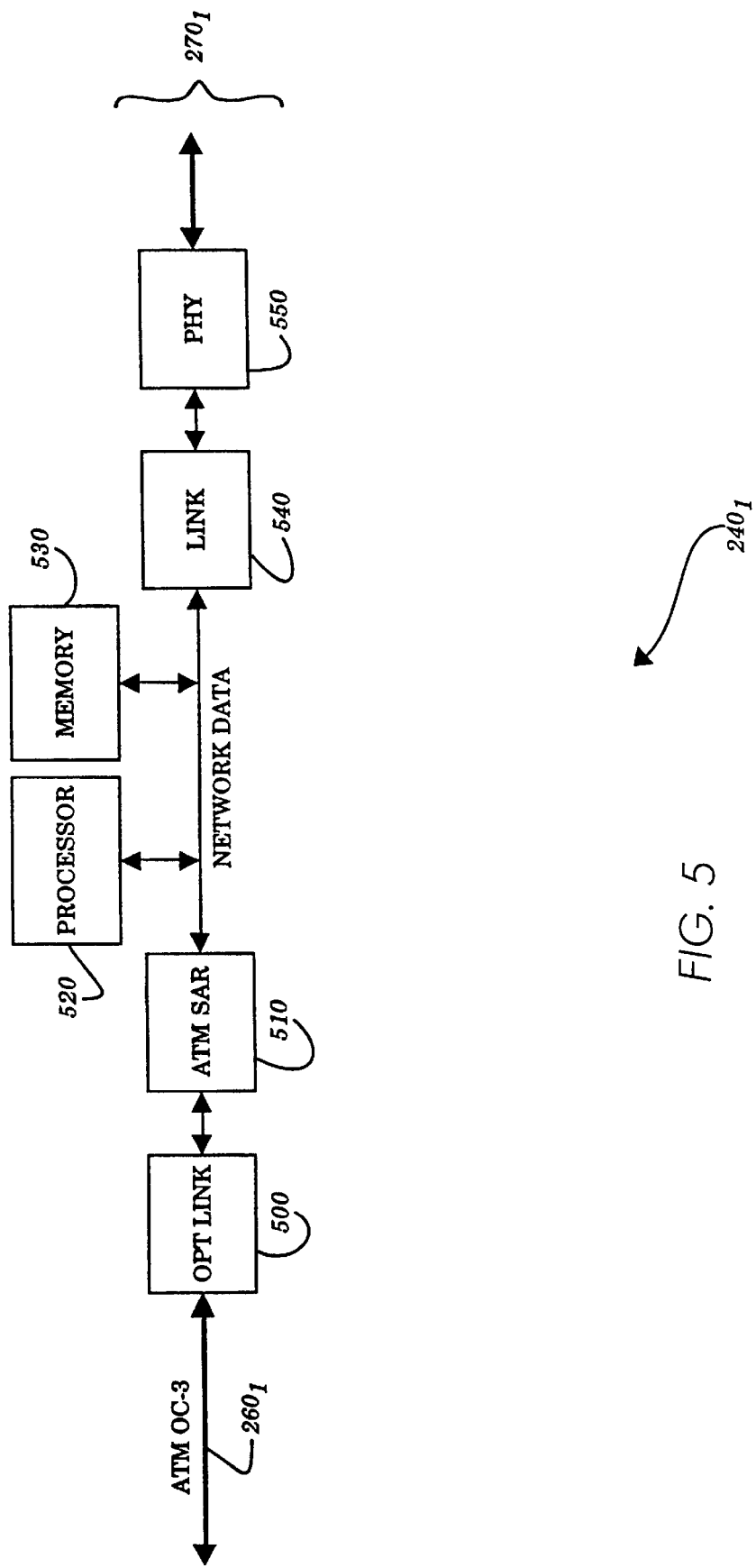
FIG. 5 is an embodiment of relevant components of one of the zone bridge units implemented within the IFE system of FIG. 2.

A block diagram illustrating one embodiment of a ZBU (e.g., ZBU $240_1$) is shown in FIG. 5. The ZBU $240_1$ includes an optical receiver link 500 coupled to fiber optic digital communication link $260_1$ of the ATM network for communicating over the network. The optical receiver link 500 is also coupled to an ATM segmentation and reassembly ("SAR") device 510. The ATM SAR 510 is coupled to a control processor 520, a memory circuit 530 and a network link circuit 540 for communicating between the ATM network and the serial distribution network. The network link circuit 540 is coupled to the serial distribution network through a physical interface circuit 550 in order to transfer video to a set of SEUs (e.g., SEUs $250_1$–$250_m$) within the zone.

Referring again back to FIG. 2, the serial distribution network 280 includes a plurality of groups of SEUs $255_1$–$255_r$, each group being coupled to one of the plurality of ZBUs $240_1$–$240_n$. Each group of SEUs $255_1$–$255_r$ (e.g., a first group $255_1$) includes a plurality of SEUs $250_1$–$250_m$ ("m" being a positive whole number), coupled preferably in series through a differential, copper wire bus $270_1$ operating in accordance with IEEE 1394 electrical standards. The IEEE 1394 bus $270_1$ and identical buses $270_2$–$270_n$ support data transfers at a rate of approximately 200 Mbps, half-duplex.

Each SEU is configured to support telephony, video display and other services associated with particular end nodes (e.g., a row of passenger seats). Each of the SEUs include a plurality of uniquely addressed processors to process data for peripherals associated with each of the end nodes. These peripherals may include, but are not limited to, a display such as a liquid crystal display or display worn by the passenger, or a passenger control unit being circuitry preferably implemented in an armrest of a passenger seat. This circuitry operates in combination with other circuitry on-board the aircraft in order to support passenger services as well as telephony and video display. Thus, each end node is assigned a channel (or information path) supported by the IFE system 200.

As described above, the serial distribution network 280 is formed between the ZBUs $240_1$–$240_n$ and the SEUs for data communications through preferably IEEE 1394 buses $270_1$–$270_n$ within a zone. The IEEE standard entitled, "P1394 Standard For A High Performance Serial Bus," Draft 8.01v2, Jul. 7, 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving ends. Each packet of data transferred isochronously is transferred in its own time period. The IEEE 1394 standard bus architecture provides multiple channels for isochronous data transfers. A multiple bit channel number is broadcast with the data to ensure proper reception and allow multiple, simultaneous isochronous data transfers across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface thereby eliminating the conversion of digital data to analog data before it is transmitted across the bus. Correspondingly, digital data will be received from the bus such that analog-to-digital conversion is not required. Devices can be added and removed from an IEEE 1394 bus while the bus is active. If a device is so added or removed, the IEEE 1394 bus will then automatically reconfigure itself for transmitting data between the then existing devices. In the IFE system 200, each SEU would form at least one "node" in association with the IEEE 1394 bus within its zone.

Referring still to FIG. 2, the IFE system 200 provides both multicast and broadcast distribution of data to the SEUs in addition to the individualized streams of data supporting the video on demand features. Broadcast distribution is used to deliver data (e.g., audio for public address announcement, audio and video content such as the safety video, etc.) simultaneously to all of the end nodes. Preferably, broadcast data has priority over any other transfer of data on the network. Multicast distribution is a subset of broadcast distribution in which data, such as data from peripherals coupled to the SIU, is delivered to only those passengers who wish to receive it.

When transmitting live broadcast data, especially images from the analog input device 215 (e.g., observation video camera), it is important that all of the passengers within the aircraft are able to receive the data simultaneously. Using the ATM network 210 and the ATM switch unit 230, data broadcast through the ATM switch unit 230 is synchronized by setting up a point-to-multipoint connection through the ATM switch unit 230. The ATM switch unit 230 receives the data stream incoming from the headend control system 211, namely the SIU 212. The ATM switch unit 230 then copies the data stream to each output port to ZBUs 240$_1$–240$_n$ via digital links 260$_1$–260$_n$. Thus, each ZBU receives a single copy of the broadcast data. The broadcast data stream passes through selected ZBU(s) which route the data to the serial distribution network 280. The serial distribution network 280 then broadcasts this stream of data to some or all of the end nodes associated with the selected ZBU(s). This secondary broadcast from the ZBU also uses a point-to-multipoint broadcast connection technique, with each SEU seeing one copy of the data stream. This technique eliminates network bottlenecks to guarantee a low distribution latency (e.g., less than one second end-to-end) for the IFE system 200, and also allows the broadcasting of a single data stream over an ATM network 210 to all of the SEUs in synchronization. The low distribution latency is due to reduced storage and forwarding of data being a result of isochronous time-based data transfer.

Similarly, when transmitting stored data (e.g., a safety video), the ATM switch unit 230 sets up a multipoint-to-multipoint connection. This allows time multiplexed data streams arriving from several media servers 214$_1$–214$_p$ to be configured in a single data stream before transmission to multiple ZBUs 240$_1$–240$_n$ as described above.

Figure 6:
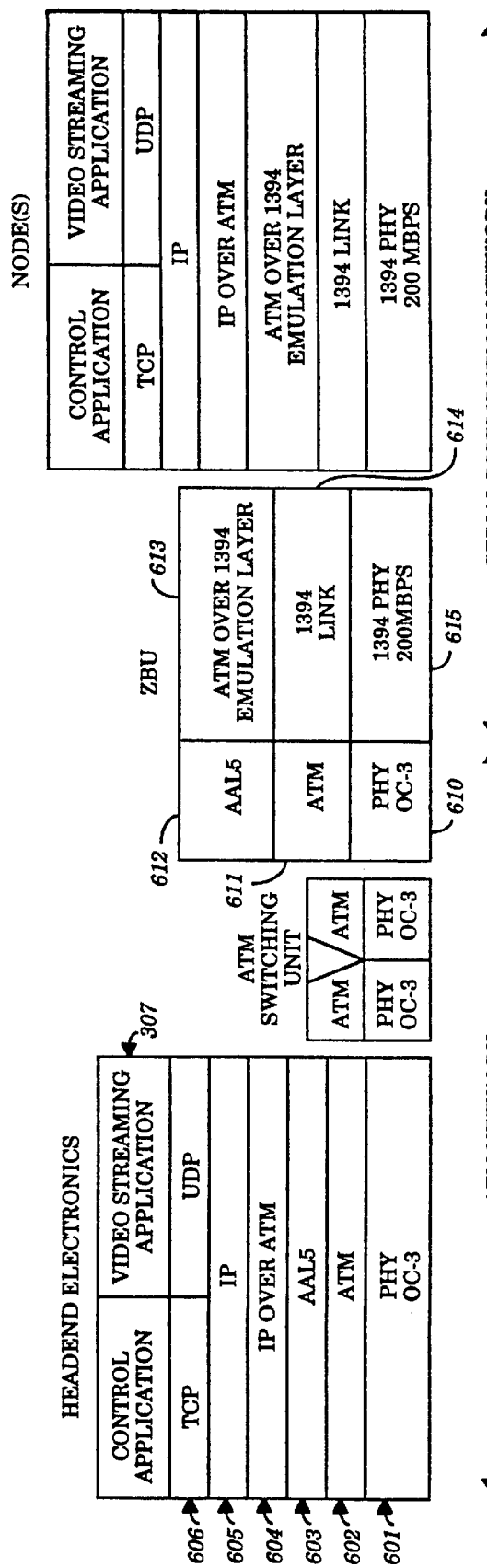
FIG. 6 is a preferred embodiment of the protocols utilized in the IFE system of FIG. 2 in transferring media from the headend control system, namely the SIU, to the passenger seats.

Referring now to FIG. 6, an embodiment of the network protocols utilized within the IFE system of FIG. 1 is shown. In general, at the headend control system, a particular series of network protocols is followed as illustrated in FIG. 6. It is contemplated that other known and future network protocols may be used depending on the configuration of the IFE system.

The network protocols utilized by the headend control system, such as the SIU, include a physical layer 601 which provides electrical, functional, and procedural characteristics to activate, maintain and deactivate the digital communication link 220$_1$ of FIG. 2. In this embodiment, the physical layer 601 is OC-3. However, it is contemplated that other physical layers may be used if the OC-3 fiber optics is not used. For example, OC-5 and other fiber optics or copper twisted wire pairs may be used.

Additionally, in this embodiment, ATM, ATM Adaptation Layer 5 ("AAL5") and IP over ATM protocols 602–604 collectively operate to control segmentation and reassembly of the ATM cells propagating through the digital communication link to the ATM switch unit 230 as shown in FIG. 2. More specifically, during transmission, information configured with an IP format is segmented into ATM cells configured in a format defined by the AAL5 protocol. Conversely, during reception, the content of the ATM cells is reassembled into a format recognized by the IP protocol.

The network protocols further include a network layer 605 and a transport layer 606. The network layer 605 provides switching and routing functions to establish, maintain and terminate network layer connections, and transfer data between transport layers. The transport layer 606 provides transparent transfers of data as required by applications 607. The applications 607 may include MPEG encoding or decoding of data streams. In this embodiment, the network and transport layers are either TCP/IP or UDP/IP. TCP is utilized as the transport layer 606 for information requiring reliable connections (e.g., applications, control information, etc.). TCP allows re-transmission if an error is detected during transmission. UDP does not offer the reliability found in TCP, but is commonly used for transmission of video streams.

Each ZBU receives ATM cells from the ATM network. In accordance with AAL5, ATM and OC-3 protocols 610–612, these ATM cells are assembled as well-known AAL5 Protocol Data Units including IP over ATM packets. The ZBU reformats the data routed from the ATM switch unit by translating the data into an IEEE 1394 compatible datagram having an arbitrary length, commonly referred to as a Service Data Unit ("SDU"), and appending the appropriate IEEE 1394 header to the SDU. This formatting is accomplished by an adaptation layer referred to as an ATM over IEEE 1394 Serial Bus Emulation Layer ("ASEL") 613. ASEL carries the SDU of AAL5 as is, so that ZBU can transfer the data transparently. ASEL provides data fragment/defragment function to adopt difference of packet size. These ASEL functions emulates the condition as if SEU is directly connected to the ATM switch unit, so upper layer software can be used. Readers interested in ASEL type layers can consult Japanese Patent Application (Publication No. P08-082545) by Sony Corporation of Tokyo, Japan.

The ZBU further includes an IEEE 1394 data link layer 314 and an IEEE 1394 physical layer 315 supporting data transmissions of approximately 200 Mbps. One implementation of these layers are disclosed in an IEEE publication entitled "P1394 Standard for a High Performance Serial Bus", Draft 8.0v2, dated Jul. 7, 1995.

Figure 7:
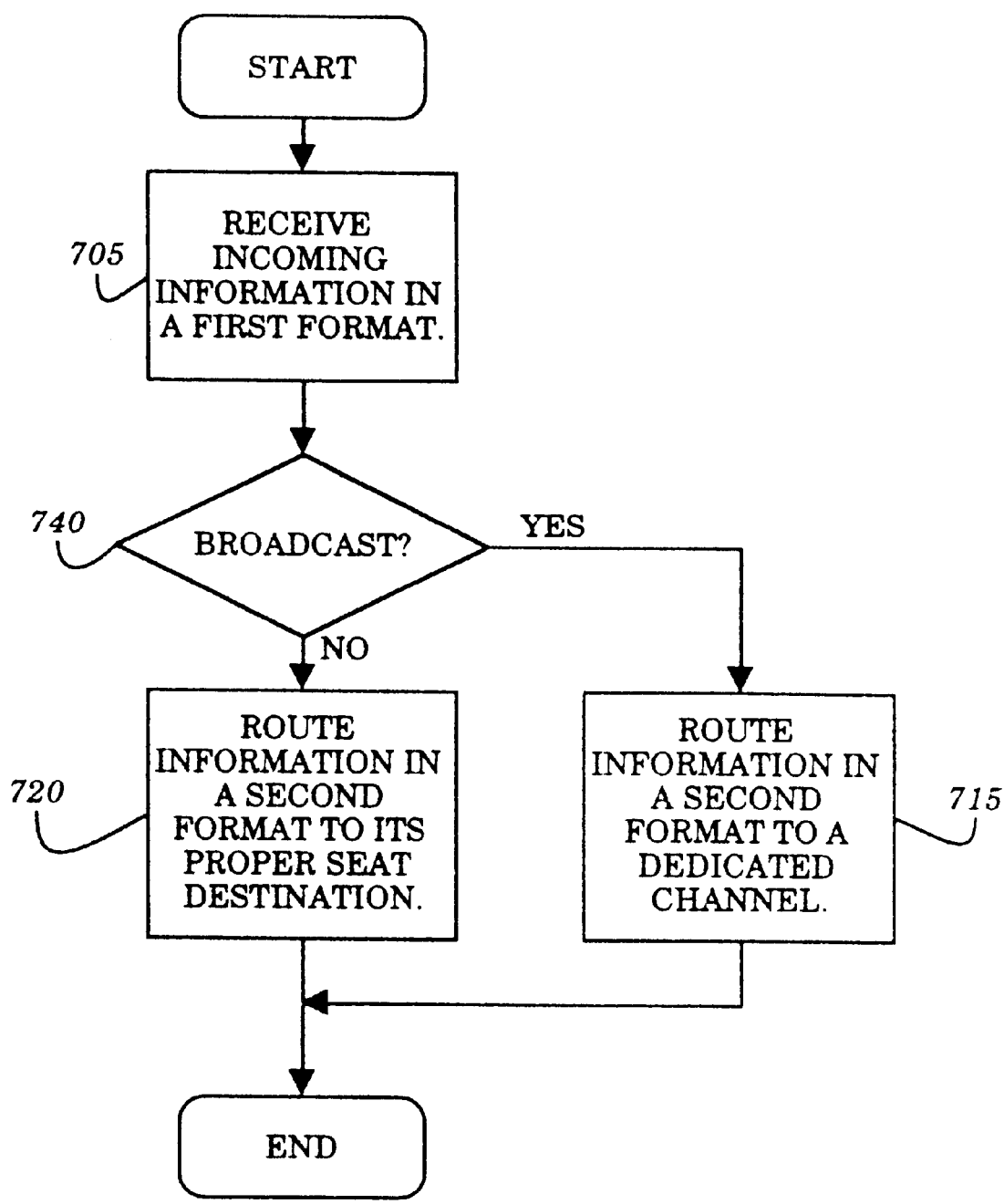
FIG. 7 is a flowchart illustrating the operations of the hybrid topology of the IFE system of FIG. 2.

Referring now to FIG. 7, the operational steps of the IFE system to support the broadcast of data in real-time as well as video on demand is shown. In step 700, the ZBU receives incoming data preferably in the form of ATM cells. Next, the ZBU determines whether the incoming data involves broadcast transmissions (Step 710). This is accomplished by determining the bit value of the routing identification, formed by the collective bit representation of the VPI and VCI of the ATM cell. A predetermined range of the routing identification is used to indicate that a particular channel has been reserved for broadcast information and channel numbers outside this range are reserved for information transfers directly to passenger seats on the aircraft. If the incoming data involves broadcast transmissions, the incoming data is routed to a designated broadcast channel of the wire bus operating in accordance with IEEE electrical standards (Step 715). Otherwise, the incoming data is routed through a dedicated channel to a targeted passenger seat identified by the routing identification (Step 720).

The present invention described herein may be designed in many different embodiments and using many different configurations. While the present invention has been described in terms of various embodiments, other embodiments may come to mind to those skilled in the art without departing from the spirit and scope of the present invention. The invention should, therefore, be measured in terms of the claims which follow.

What is claimed is:

1. A digital passenger entertainment system implemented within a vehicle having a plurality of end nodes, comprising:
    a first digital network to receive information in an analog format and to transfer the information in a first digital format;
    a second digital network to transfer the information in a second digital format supporting asynchronous and isochronous data transfers to each of the plurality of end nodes, the second digital network includes a high speed, serial distribution network that transfers information according to an IEEE 1394 standard; and
    a bridge circuit coupled to the first digital network and the second digital network, the bridge circuit to receive the information in the first digital format, to convert the information from the first digital format into the second digital format, and to output the information in the second digital format to the second digital network.

2. The digital passenger entertainment system according to claim 1, wherein said first digital network is an Asynchronous Transfer Mode (ATM) network which transfers the information in the first digital format through ATM cells.

3. The digital passenger entertainment system according to claim 2, wherein the bridge circuit includes a plurality of zone bridge units.

4. The digital passenger entertainment system according to claim 3, wherein each of the plurality of zone bridge units includes a processor and internal memory.

5. The digital passenger entertainment system according to claim 3, wherein the ATM network includes
    an input device which captures the analog information;
    a headend electronic device which digitizes the analog information into the information in the first digital format; and
    an ATM switch circuit coupled to the headend electronic device, the ATM switch circuit replicates the information in the first digital format for concurrent transmission to the plurality of zone bridge units.

6. The digital passenger entertainment system according to claim 5, wherein the input device includes one of a video reproduce unit, a video camera, and an audio reproduce unit.

7. A digital passenger entertainment system implemented within a vehicle having a plurality of end nodes, comprising:
    a digital Asynchronous Transfer Mode (ATM) network to transmit and to receive at least one ATM cell; and
    a digital serial distribution network to transfer digital information in accordance with IEEE 1394 standards to each of the plurality of end nodes; and
    a bridge circuit coupled to said ATM network and said serial distribution network, said bridge circuit to receive the at least one ATM cell, to convert the at least one ATM cell into at least one datagram in compliance with IEEE 1394 standards, and to output the at least one datagrams to the serial distribution network.

8. The digital passenger entertainment system according to claim 7 further comprising a plurality of zone bridge units, said plurality of zone bridge units interconnect said digital ATM network and said digital serial distribution network.

9. The digital passenger entertainment system according to claim 8, wherein each of the plurality of zone bridge units includes a processor and internal memory.

10. The digital passenger entertainment system according to claim 8, wherein said digital serial distribution network includes a high speed, serial distribution network that transfers information according to an IEEE 1394 standard.

11. The digital passenger entertainment system according to claim 10, wherein said digital serial distribution network further a plurality of seat electronics units, a first seat electronics unit of said plurality of seat electronics units controls a transfer of information received from a zone bridge unit of said plurality of zone bridge units.

12. The digital passenger entertainment system according to claim 7, wherein the ATM network includes
    an input device to capture analog data;
    a headend electronic device to digitize said analog data into digital data; and
    an ATM switch unit coupled to said headend electronic device, the ATM switch unit replicates said digital data for concurrent transmission to said plurality of zone bridge units.

13. The digital passenger entertainment system according to claim 12, wherein the input device includes one of a video reproduce unit, a video camera, and an audio reproduce unit.

14. A digital passenger entertainment system implemented within a vehicle, comprising:
    a digital Asynchronous Transfer Mode (ATM) network to deliver information in a first digital format;
    a digital serial network to deliver information in a second digital format support asynchronous and isochronous data transfers, the digital serial network including a high speed, digital serial bus operating in accordance with an IEEE 1394 standard; and
    a bridge circuit coupled to the ATM network and the digital serial network, the bridge circuit to convert the information between the first digital format into the second digital format in order to support a transfer of the information between the digital ATM network and the digital serial network.

15. A digital passenger entertainment system implemented within a vehicle having a plurality of end nodes, comprising:
    a first digital network to receive information in an analog format and to transfer the information in a first digital format;
    a second digital network to transfer the information in a second digital format supporting asynchronous and isochronous data transfers to each of the plurality of end nodes;
    a bridge circuit coupled to the first digital network and the second digital network, the bridge circuit to receive the information in the first digital format, to convert the information from the first digital format into the second digital format, and to output the information in the second digital format to the second digital network; and
    the second digital network including a plurality of seat electronics units, a first seat electronics unit of the plurality of seat electronics units controls transfer of the information in the second digital format received from a zone bridge unit in the bridge circuit.

* * * * *